United States Patent [19]

Brussels et al.

[11] 4,161,169
[45] Jul. 17, 1979

[54] FOCUSSING FLAT PLATE SOLAR COLLECTOR DEVICE

[75] Inventors: Nathan E. Brussels; Edwin S. Piasecki, both of Cherry Hill, N.J.

[73] Assignee: Solar Energy Systems, Inc., Cherry Hill, N.J.

[21] Appl. No.: 815,499

[22] Filed: Jul. 14, 1977

Related U.S. Application Data

[63] Continuation of Ser. No. 813,637, Jul. 7, 1977, abandoned.

[51] Int. Cl.² .................................................. F24J 3/02
[52] U.S. Cl. ................................. 126/271; 165/86; 165/96; 74/55
[58] Field of Search .............. 126/270, 271; 237/1 A; 415/122 R; 165/86, 96; 74/55, 56, 57, 58, 25

[56] References Cited

U.S. PATENT DOCUMENTS

| | | |
|---|---|---|
| 2,544,474 | 3/1951 | Swanton, Jr. .................. 126/271 |
| 3,828,570 | 8/1974 | Stutz ............................. 165/104 |
| 3,994,279 | 11/1976 | Barak ........................... 126/270 |
| 4,014,313 | 3/1977 | Pedersen ....................... 126/270 |
| 4,076,026 | 2/1978 | Copping ........................ 126/271 |

FOREIGN PATENT DOCUMENTS

| | | | |
|---|---|---|---|
| 938012 | 9/1963 | United Kingdom ........... | 126/271 |
| 486189 | 1/1976 | U.S.S.R. ........................ | 126/270 |

*Primary Examiner*—James C. Yeung

[57] ABSTRACT

A solar collector is disclosed that enables the installation of the collector parallel to the surface plane or angle of any structure, including vertical walls and flat roofs, without affecting generating efficiency. The collector is efficient for both energy absorption and transfer to the transport fluid. The collector removes architectural constraints and is suitable for building structure applications not heretofore possible. The collector comprises an array of integral fin/tube extrusions all of which are aligned in the East-West direction. Mechanical linkage rotates the extrusions in unison, with a sun tracking device, to the solar altitude angle. The extrusions, mechanical linkage, and sun tracking device are contained within an insulated housing enclosure. The integral fluid channels likewise extend in an East-West direction, are spaced apart in the North-South direction and are directed to supply and return manifold piping extending in the North-South direction with inlet and outlet connections. The extrusions have a black anodized selective coating for high absorptance and low emittance. The housing enclosure has a glazing cover.

17 Claims, 27 Drawing Figures

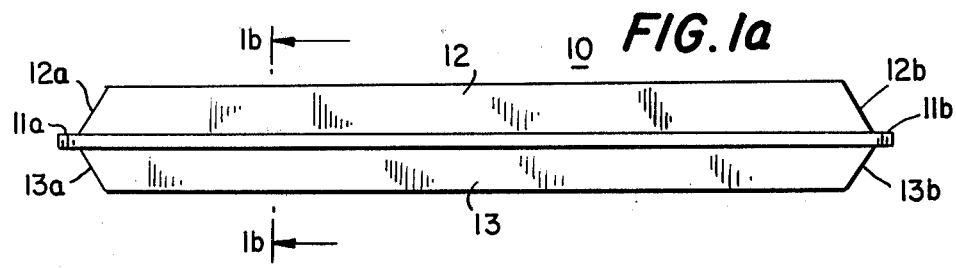
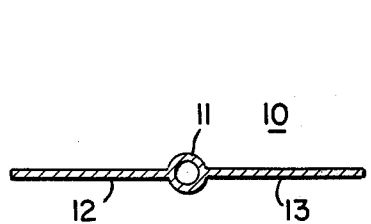
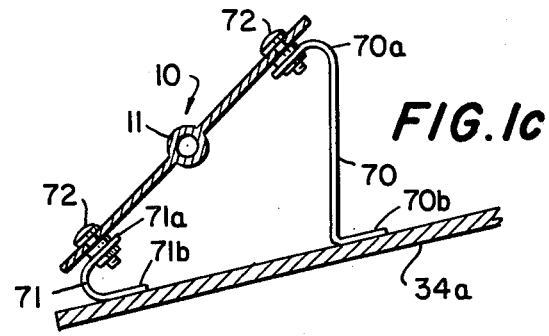
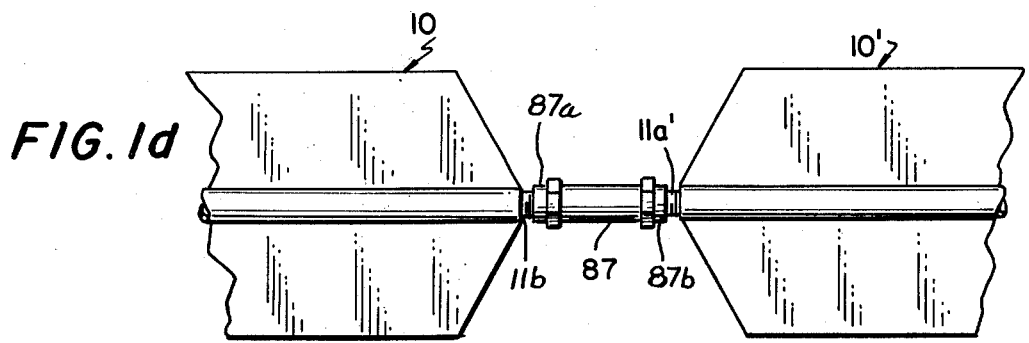
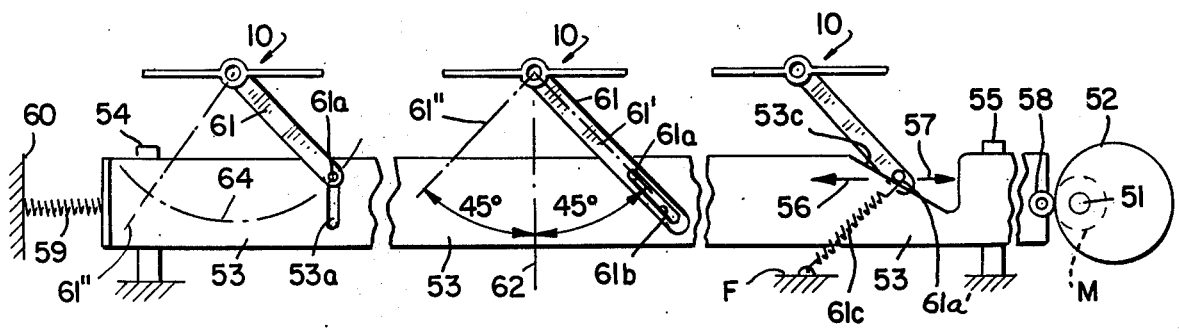

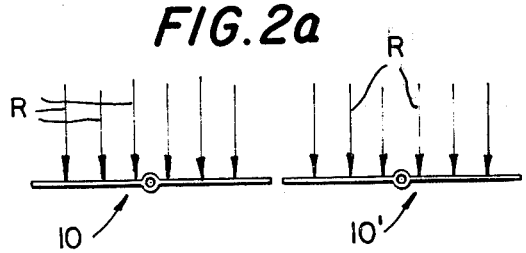
FIG.2a
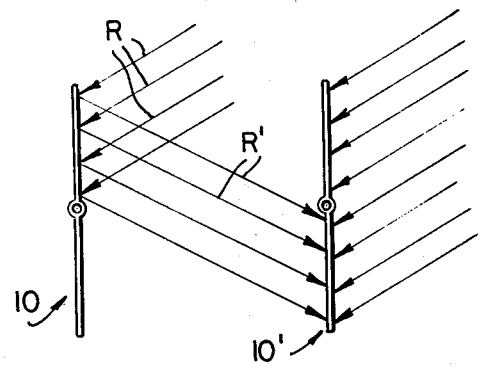
FIG.2b
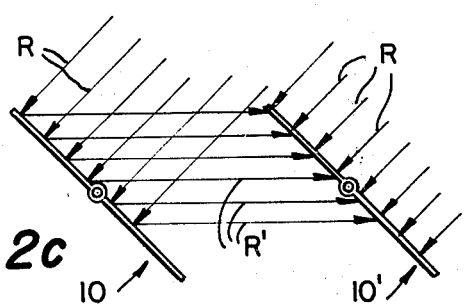
FIG.2c
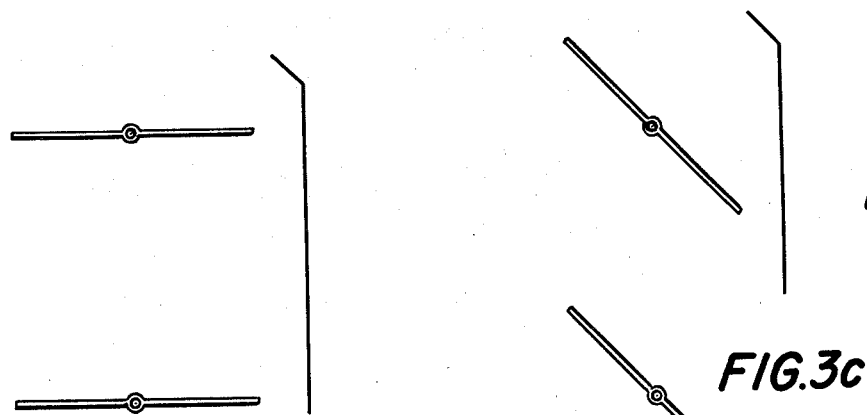
FIG.3b
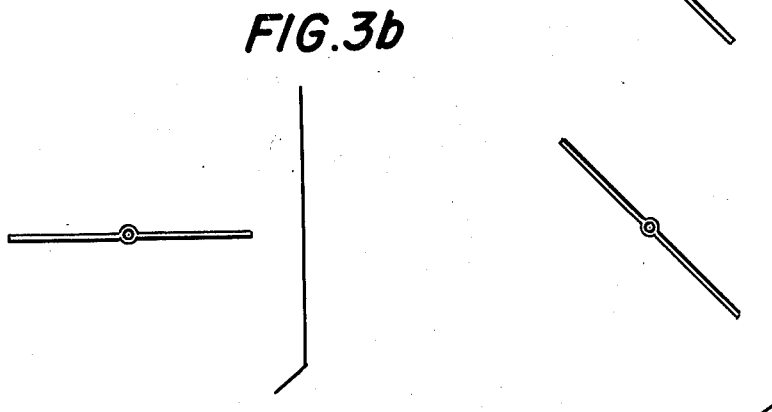
FIG.3c
FIG.3a

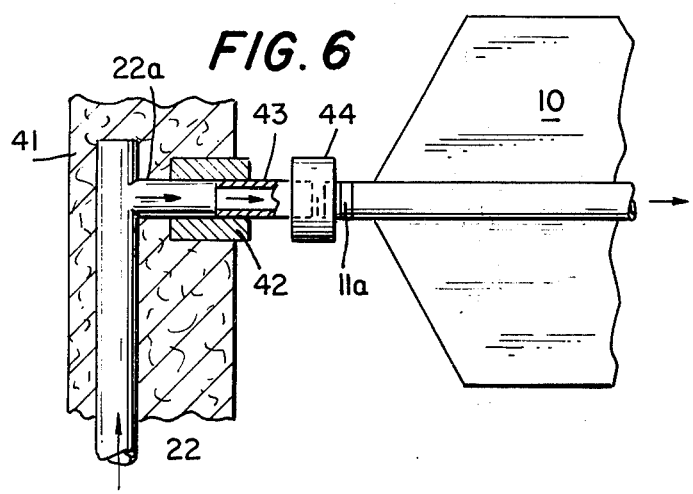
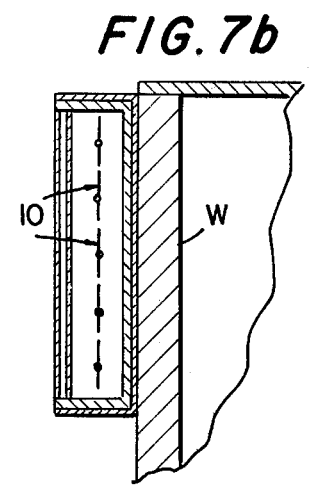
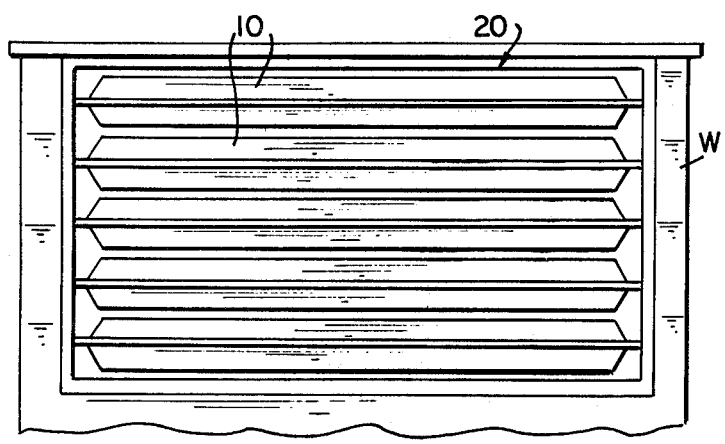
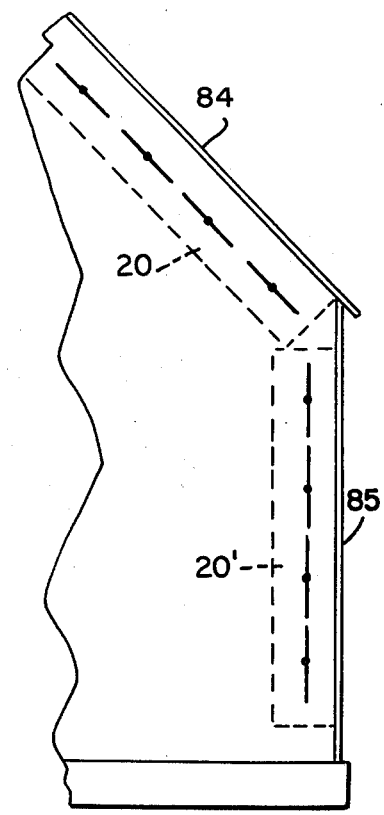
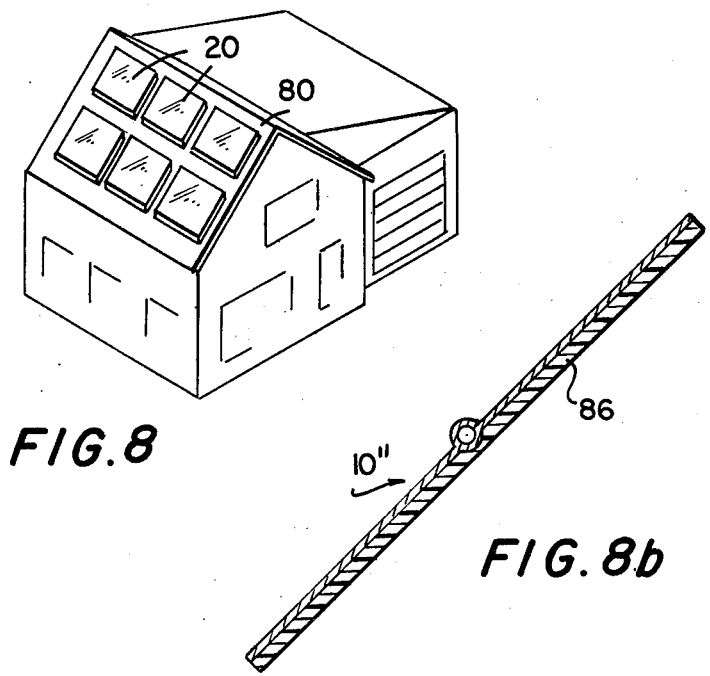

FOCUSSING FLAT PLATE SOLAR COLLECTOR DEVICE

BACKGROUND OF THE INVENTION

This is a continuing application based on copending application Ser. No. 813,637 filed July 7, 1977, how abandoned.

The present invention relates to solar energy collection systems and more particularly to solar energy collectors designed to change its orientation to maximize the amount of solar energy captured and to greatly simplify and enhance installation from both the mechanical and architectural point of view.

The importance of seasonal and diurnal variation in the solar altitude is critical to the performance of the flat plate collector, and, combined with the installation versatility and economics of the collector described, initiates the concept of a stationary focusing flat plate collector. The utilization and benefits of the proposed device are described.

The state-of-the-art design of non-concentrating flat-plate type solar collectors is limited to their architectural adaptation to building structures. Regardless of plane, the solar collectors must be tilted to an angle optimized for solar radiation interception. The effect of the angle of incidence on efficiency is twofold; first, as the incidence angle increases, the amount of solar radiation impinging on the collector is reduced by a cosine factor; second, as the angle of incidence increases, the reflectance of the housing transparent cover plates increases. For values of incidence angle large than 50°, the transmittance of the glass plate decreases rapidly, and reflective losses increase correspondingly.

The latitudes of geographical U.S.A. generally require a solar collector tilt angle above a horizontal plane. The seasonal changes of the solar altitude require changes in the solar collector tilt angle; however, since the solar collector is in a stationary position, the tilt changes cannot be accomplished. Without the ability to alter the solar collector tilt angle, the solar collector preferred angle is optimized to the solar altitude angle of the winter season for the continent in which the solar collector is located. In addition to the loss of solar interception for the remaining seasons, the solar collector which is mounted in a stationary position cannot track the daily solar altitude.

A further problem inherent to the stationary position of a solar collector is the structural support required, particularly due to the angle elevations required. A large array of solar collectors requires a substantial amount of structural support which adds to the building weight support load and construction costs.

A further problem encountered is the architectural design considerations given to solar collectors which must be elevated to an angle above a horizontal plane or a slope angle, which deviates from the required solar collector tilt angle. Conventional solar collectors cannot be integral to the roof design unless the roof slope angle is coincidentally equal to the solar collector design tilt angle.

The necessity of elevating the solar collector to an angle above the horizontal surface plane or building roof slope angle to increase capture efficiency nevertheless submits the solar collector to greater exposure to wind. The wind factor increases the conductive heat loss of the solar collector and therefore, decreases the efficiency.

Convective losses occur from the absorber plate to the environment through the intermediate convection exchanges between the air enclosed in each insulating zone and the boundaries of each zone, i.e. the collector covers. In the absence of wind, internal and external convection loss of the outermost cover occurs due to the mechanism of natural convection; but even in low winds, forced convection occurs and increases the loss substantially.

BRIEF DESCRIPTION OF THE INVENTION

The approach to solving the problems stated herein is the design of a solar collector which can be mounted in a stationary fashion relative to a horizontal or vertical plane or of any slope angle without the necessity of elevating the solar collector to an angle which differs from the geometrical plane of the supporting structure. The solar collector is designed to intercept the solar radiation at optimum angles to the daily and yearly solar altitude angles.

It is not necessary to move the solar collector to maintain the collector in focus, wherein only the absorber plates which collect the energy, need move in a planar motion from morning to night.

The present invention is characterized by comprising a plurality of integral fin/tube extrusions arranged in spaced parallel fashion and mounted within a metallic enclosure. The extrusions are aligned with the axes of the tubes constituting the rotational axis for each such tube which is hollow and adapted to guide a fluid therethrough. The ends of each extrusion extend into hydraulic rotary fittings mounted within the enclosure and connected to respective supply and return fluid manifolds at opposite ends of the enclosure. The hydraulic rotary joints enable rotation of the extrusions, with a mechanical linkage common to all of the extrusions providing simultaneous rotation of the extrusions to the desired orientation in order to ensure maximum energy absorption from the sun's rays as the sun changes its position throughout the day relative to the assembly. The housing enclosure is insulated and is covered with a double layer of glass.

The absorber extrusions are treated with either a black paint or a selective coating which minimizes emissivity and maximizes absorptivity of the sun's rays including those rays in both the visible and invisible wave length ranges.

The absorber plates are adjusted to the solar altitude angle and, in manual mode, are adjusted to the optimum tilt angle of solar interception taking into consideration the latitude and seasonal requirement of the system application. In the automatic mode, absorber plates are adjusted for planar motion from morning to night. The heat energy transfer fluid is circulated through the supply fluid manifold with parallel flow through the absorber plate tubing to the return fluid manifold, typically under normal water pressure, at which point the transfer fluid exits the solar collector for introduction into the output utilization means which may be a heating and/or cooling system, a fluid storage tank and the like.

The water which is fed under pressure to the collector may be advantageously utilized to serve as the motive power for tracking the sun. Impeller means is rotated by the water being pumped to the solar collector and its rotation is suitably reduced by a reduction-gear assembly to provide the desired tracking profile. This arrangement totally eliminates the need for providing electrical power to the roof mounted solar collectors while taking full advantage of the available water being pumped to the collector.

The advantages of the system reside in the simplification of both installation procedures and apparatus design, thereby relieving severe architectural constraints, and allowing mounting at substantially any angular orientation.

The manual or automatic angle elevation offers optimum solar interception. The manual embodiment may be periodically adjusted on either a daily or seasonal basis, the automatic method providing even greater efficiency.

The design also reduces conductive loss from wind current as well as reducing possible damage due to wind loading and further provides improved fluid flow and reduced pressure drop.

It is therefore a primary object of the present invention to provide a novel, non-concentrating solar collector assembly providing increased energy absorption efficiency while at the same time significantly reducing the constraints regarding mounting techniques and orientation.

BRIEF DESCRIPTION OF THE FIGURES

The above as well as other objects of the present invention will become apparent when reading the accompanying description of drawings in which:

FIGS. 1a and 1b show top plan and end views respectively of a fin/tube convector of the present invention.

FIGS. 1c shows one optional mounting assembly for a fin/tube and FIG. 1d shows one arrangement for joining fin/tube assemblies end to end.

FIG. 1e shows an elevational view of tracking apparatus.

FIGS. 2a through 2c shows a fin/tube and the effect of the angle of incidence of a radiation ray for fin/tubes arranged at various angles.

FIGS. 3a through 3c show side elevational views of a plurality of fin/tube solar collectors arranged at vertical, horizontal and diagonal orientations, respectively.

FIG. 5 shows a top plan view of an assembled solar collector, while

FIG. 6 is a schematicized view of the extrusion absorber plate piping and its connection with the manifold.

FIGS. 7a and 7b show front and side sectional views of an absorber plate assembly mounted in the vertical plane.

FIG. 8 shows a perspective view of a plurality of solar collectors mounted upon a sloping roof.

FIG. 8a shows an elevational view of a modified solar collector designed for use in a greenhouse, and FIG. 8b shows an end view of a fin/tube employed in the modified solar collector of FIG. 8a.

DETAILED DESCRIPTION OF THE INVENTION

Figure 4A:
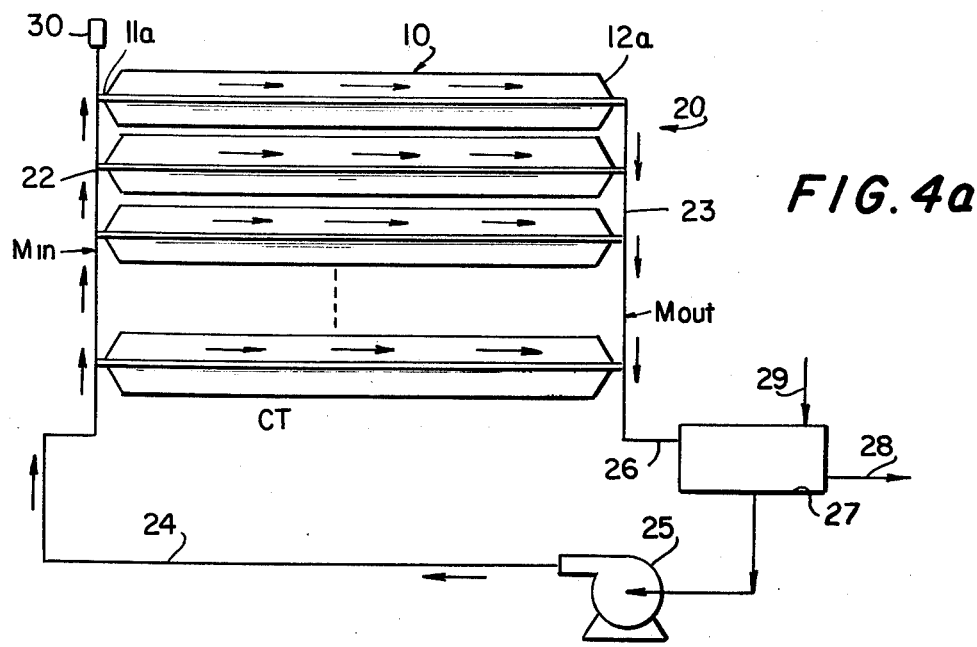
FIG. 4a is a schematic fluid flow diagram of a typical system installation.

FIGS. 1a and 1b show a fin/tube convector assembly 10 comprised of a centrally located tubular portion 11 and outwardly extending arms or fins 12 and 13 arranged in a common plane and integrally formed with the central hollow tubular portion 11 preferably by means of an extrusion process. The fins taper at their ends 12a–12b and 13a–13b and terminate short of the extreme ends of the tube which is provided with threaded portions 11a and 11b.

In the embodiments to be more fully described, a plurality of such convectors 10 are employed in a modular type solar collector assembly. FIGS. 2a through 2c show the effect of the angle of incidence of radiation rays upon extrusions oriented at various angles, FIG. 2a showing a pair of convectors 10 and 10' arranged horizontally and being exposed to radiation oriented in the downward vertical direction, said rays being identified as arrows R.

FIG. 2b shows a pair of convectors 10 and 10' oriented in the vertical direction and being exposed to radiation in the form of rays R directed generally in the diagonally downward direction. The rays can be seen to impinge upon the righthand surfaces of the convectors 10 and 10' and are deflected (wherein the angle of reflection is equal to the angle of incidence) whereby the reflected rays R' are directed toward the lefthand side of convector 10'.

FIG. 2c shows a pair of convectors 10 and 10' exposed to rays R oriented diagonally downward so as to impinge upon the righthand surfaces of convectors 10 and 10' and being reflected as represented by rays R' so as to strike the lefthand surface of convector 10'.

FIGS. 3a, 3b and 3c show the convectors being arranged so that their central axes lie on an imaginary vertical plane wherein the individual convectors are rotated in FIG. 3a so that their fins all lie in a common vertical plane whereas the fins lie in spaced parallel horizontally aligned planes as shown in FIG. 3b and whereas the fins are arranged in spaced parallel planes which are diagonally aligned as shown in FIG. 3c. From the orientations of FIGS. 2a and 2c and 3a through 3c it can be seen that the convectors, when rotatably mounted, are adapted to capture radiation with a high degree of efficiency regardless of the orientation of the solar collector housing, as will be described in greater detail hereinbelow.

FIG. 4a is a schematic diagram showing the manner in which the modular design solar collector assembly may be integrated into a system for utilizing solar energy.

The system is comprised of a single solar collector assembly 20, having a plurality of fin/tube convectors 10 whose lefthand ends 11a are all joined to manifold tube 22 and whose righthand ends 12a are all joined to common manifold tube 23. The inlet manifold 22 is coupled through a conduit 24 to pump 25 for pumping the fluid into the solar collector. The outlet manifold 23 is coupled through conduit 26 to the inlet opening of an energy storage tank 27 which may for example be a hot water tank, swimming pool, or heated fluid source for use in connection with a heating system which may be coupled thereto through fluid conduit 28. Fresh fluid may be introduced into the system through inlet 29. An automatic air vent 30 is provided at the downstream end of inlet manifold 22 for bleeding air from the system.

Figure 4B:
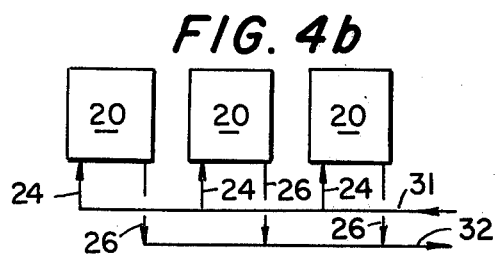
FIGS. 4b and 4c show parallel and series connections respectively for a plurality of solar collector modules.
Figure 4C:
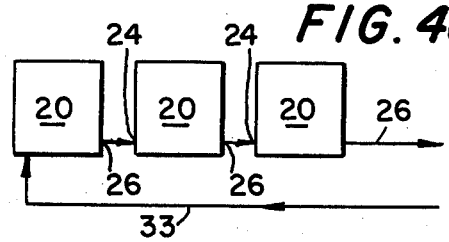

FIGS. 4b and 4c show two arrangements wherein a plurality of solar collectors of the modular type shown as solar collector 20 of FIG. 4a may be employed, FIG. 4b showing a plurality of such collectors 20 being arranged in a parallel arrangement wherein an input conduit 31 is coupled to common to the inlet manifolds 22 of each solar collector by means of conduit 24 and wherein an outlet conduit 32 receives the fluid which has been heated, by means of its common connection with the outlet conduits 26 connected to their outlet manifolds 23 of each solar collector assembly 20.

In the arrangement of FIG. 4c, a series arrangement is utilized wherein a single inlet conduit 33 is coupled to the inlet conduit 24 of the lefthandmost collector assembly 20 which has its outlet conduit 26 coupled to the inlet conduit of the next adjacent collector assembly 20, with this pattern being repeated in the manner shown. The particular system utilized depends more particularly upon the specific application and the arrangements shown are merely exemplary of the types of applications in which the system of the present invention may be advantageously employed.

FIGS. 5-5b, 6 and 7 show the solar collector assembly 20 in greater detail. Considering FIG. 5b, the housing enclosure is comprised of a floor portion 34a and side walls 34b and 34c, each of which are lined with insulation as shown at 35. The individual convectors 10 are rotatably mounted in a manner to be more fully described within hydraulic bearings so as to be arranged in parallel fashion as shown and to be freely rotatable therein without any impediments thereto.

The open-ended portion of the enclosure is fitted with a pair of low-iron safety tempered glass plates 36, 37 pre-assembled within a frame preferably containing a dessicant for moisture removal between the layers. The enclosure is a metallic housing preferably formed of steel or aluminum.

The exterior surface of the tubes 11 and the fins 12 and 13 which are formed as an extruded aluminum member are provided with a black anodized finish. The finish, in one preferred embodiment, is preferably a selective type coating having a high absorption efficiency with respect to solar energy in both the visible and invisible (i.e. infrared) wave lengths while having a low emissivity, preferably less than 11%. The connectors 11a and 11b provided at the opposite ends thereof are preferably brazed to the extrusion, although other arrangements may be provided if desired.

Figure 5:
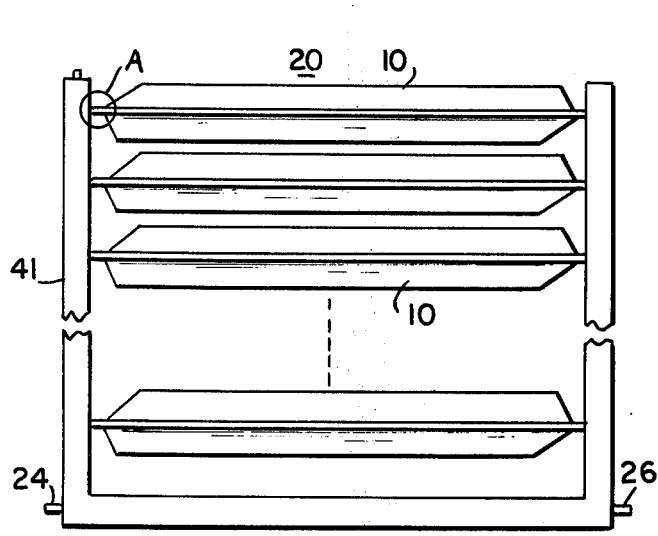
Figure 5A:
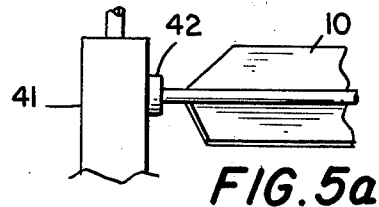
FIG. 5a shows an enlarged view of detail "A" of FIG. 5.
Figure 5B:
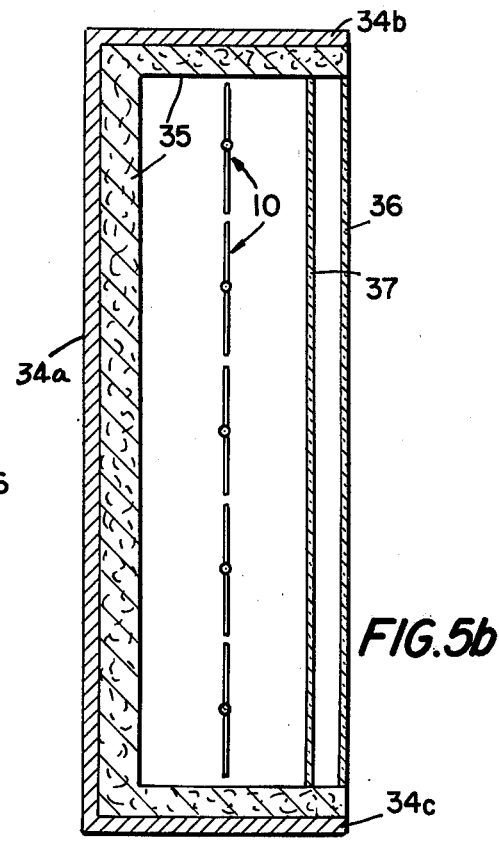
FIG. 5b shows a sectional view of the solar collector enclosure.

FIGS. 5 and 5a show the manner in which the convectors 10 are rotatably mounted. There is provided therein a substantially U-shaped housing 41 arranged within the enclosure shown in FIG. 5b and provided with inlet and outlet fluid connections 24 and 26. The brazed ends of the tubes are mounted within hydraulic rotary joints 42 which extend outwardly from the linkage mechanism housing 41. FIG. 6 shows housing 41 as containing the inlet manifold 22 having a coupling portion 22a extending into one end of hydraulic rotary joint 42 with the opposite end receiving a nipple 43 joined to the end 11a of fin/tube 10 by coupler 44. The opposite end 11b of the tube 11 is coupled to the outlet manifold 23, has section 23a thereof joined to a hydraulic rotary joint substantially identical to that shown in FIG. 6.

FIG. 1e shows the manner in which the fin/tubes 10 may be automatically adjusted to track the sun's rays. In order to achieve maximum absorptivity, it is important that the radiation from the sun strike the fin surfaces, which constitute the major portion of the absorptive surface, at a right angle. This can best be accomplished by providing equipment which automatically tracks the sun.

FIG. 1e shows such apparatus which comprises motor M having an output shaft 51 upon which is mounted eccentric cam 52. An elongated bar or rod 53 is slideably mounted between guides 54 and 55 so as to be limited to experiencing longitudinal movement in the direction shown by either arrow 56 or 57. The rod is provided at one end thereof with a rotatably mounted roller 58 which functions as a cam follower and bears against the cam surface of eccentric cam 52. Suitable spring means are provided, for example spring means 59 which is arranged between the lefthand end of bar 53 and a stationary surface 60 so as to normally urge bar 53 in the direction shown by arrow 57 and further so as to constantly maintain cam follower roller 58 in engagement with the cam surface of cam member 52.

Each of the fin/tube structures 10, which are rotatably mounted within a pair of associated rotary hydraulic joints, are provided with projections 61 which are aligned at a 45° angle relative to imaginary vertical line 62, when the fins of the fin/tube structures 10 are aligned in horizontal fashion, as shown.

Rod 53, in one preferred embodiment, is provided with a plurality of elongated vertically aligned slots 53a adapted to receive a pin 61a extending from the free end of each of the arms 61.

As the cam rotates, preferably one full revolution per 24-hour period, the rod 53 is, for example, moved in the direction shown by arrow 56 causing all of the projections 61 to be rotated clockwise from a diagonal alignment through a vertical alignment 62 and ultimately to a diagonal alignment 61" so as to be positioned to the left of imaginary line 62 and forming an angle of 45° therewith. Thus the arm 61 undergoes rotation through a 90° angle with each of the slots 53a arranged at spaced parallel intervals along bar 53 serving to permit the pins 61a to experience movement within the slot in order to accommodate the arcuate path 64 traversed by each of the pins 61a, while limiting the bar 53 to longitudinal movement.

The motor M may be replaced, in manual systems, by a crank arm accessible from the exterior of each enclosure for the purpose of optimum orientation of the fin/-tube structures relative to the geographical location of the particular installation. If desired, other eccentric cams may be provided to alter the angular sweep experienced by the fin/tubes structures during each 24-hour period to an angle of greater or lesser than 90° or over a period less than 24 hours, again depending upon the requirements of the particular geographical location.

The pins 61a may alternatively be fixedly secured to bar 53 and each of the projections 61 may be provided with an elongated slot, much as slot 61b to accomplish the same results as the slot 53a in bar 53.

As a further alternative, the slots 53a may be eliminated and replaced by diagonally aligned cam surfaces positioned adjacent to the pin 61a' provided in the free end of each projection, which pin is coupled to a spring 61c secured between pin 61a' and the floor F of the solar collector housing. Although three alternative arrangements are shown in FIG. 1e, it should be understood that only one of these embodiments would be employed in any one solar collector module.

As a further alternative, the manual and automatic tracking devices may be totally eliminated and replaced by optional mounting supports as shown in FIG. 1c wherein a pair of mounting brackets 70 and 71 are provided for mounting each fin/tube structure 10 to the base plate 34a of the housing. Fastening members 72 are provided for securing the ends 71a and 70a to the fin/tube structure 10. The opposite ends 71b and 70b may be mounted in a similar fashion or alternatively may be soldered, welded, brazed or otherwise secured to the base plate.

With this technique, the mounting supports are bent so as to orient the fin/tube elements at the optimum angle for the particular installation.

Some examples of installation orientations are shown in FIGS. 7a, 7b and 8. FIGS. 7a and 7b show the solar collector 20 mounted along a vertical surface or wall W, FIG. 7a showing a front view and FIG. 7b showing an end view, partically sectionalized. Due to the capability of orienting each and every one of the fin/tube elements 10, it is possible to track the sun and absorb radiation from the sun at a high absorption efficiency. Similarly, a plurality of such solar collectors 20 are shown in FIG. 8 as being arranged upon a sloping roof surface 80 of a building or dwelling, for example, the collectors again shown as being flush mounted to the surface.

The devices are preferably installed in a stationary manner directed to the South, plus or minus 20°. The absorber plates either track the sun automatically or are fixed at the desired solar altitude angle. The adjustable arrangement of each of the fin/tubes removes any architectural constraints, allowing flush mountings along any surface, vertical, horizontal or sloping. Manual or automatic angle elevation of the individual fin/tubes to the optimum of solar interception offers maximum efficiency in the transfer of energy from the sun's rays to the tubes and hence to the fluid flowing therethrough. Flush mountings significantly reduce conductive losses as well as wind loads due to elevation of the solar collector assembly relative to the mounting surface, as is required in conventional structures.

In still another arrangement, as shown in FIG. 8a, the solar collectors of the present invention may be utilized for the purpose of solar heating in commercial greenhouses. As shown in this Figure, the roof and side wall glazing 84 and 85 have positioned along their interior surfaces solar collectors 20 and 20' respectively. FIG. 8b shows the detail of one such solar collector fin/tube 10" which is provided with an insulated rear surface having an insulation layer 86 preferably formed of compressed fiberglass or urethane. In the applications shown in FIGS. 8a and 8b, the glazing normally applied in the solar collectors 20 may be omitted since the roof and wall glazing serve as an adequate substitute therefore.

In applications where it is desired to connect fin/tube structures end to end, the arrangement of FIG. 1d may be employed wherein the fin/tube structures 10 and 10' are joined by means of flexible connector 87 whose opposite ends are provided with rotatable couplers 87a and 87b which are threadedly secured to the ends 11b and 11a' of fin/tube structures 10 and 10' respectively, thus permitting two structures to be joined end to end in either the same or separate collector assemblies.

The drive for the rotatable tube/fins may utilize electrical or mechanical energy. The motor M may be powered by an a.c. (or d.c.) power source and include a shaft which rotates one full revolution per 24-hour period (for example), or may include a gear reduction box mounted between the motor output shaft and the cam 52.

As a preferred embodiment the water, which, as was described hereinabove, is fed through the collector under pressure, may be used to rotate the tube/fins 10.

Figure 9:
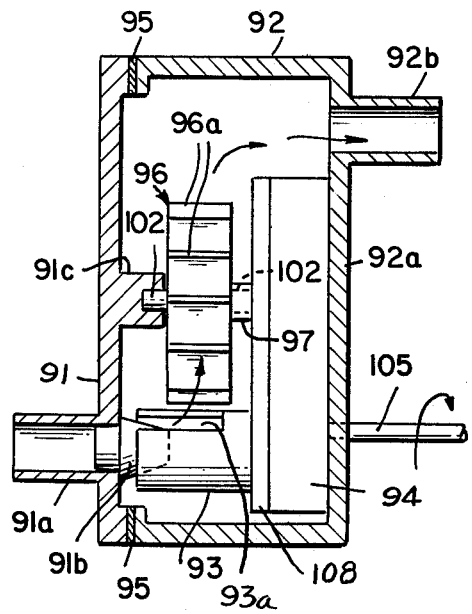
FIG. 9 is an elevational view, partially sectionalized, of a tube/fin solar-tracking mechanism using the water pumped to the solar collector as the motive power.
Figure 9B:
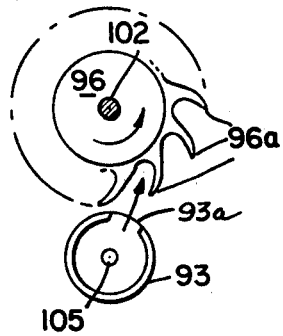
FIG. 9b shows the detailed end view of the impeller and a cooperating flow diverting element for driving two tracking mechanisms.
Figure 9A:
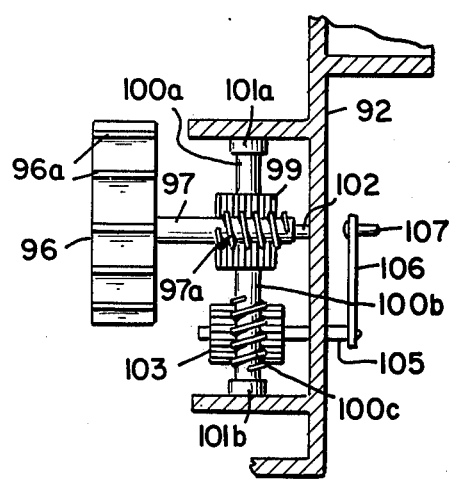
FIG. 9a shows a detailed view of the gear reduction assembly incorporated in the tracking device of FIG. 9.

As can best be seen from FIGS. 9a and 9b, the inlet tube 24 (see FIG. 4) is coupled to the hollow projection 91a extending from housing cover 91 which is water-tightly joined to housing 92. A gasket 95 is positioned between the cover 91 and the housing 92, as shown. Water passes through outer projection 91a and an inner projection 91b which extends into a projection 93 extending from gear housing 94.

The projection 93 is provided with an axially aligned slot 93a allowing water to pass outwardly through the slot so as to rotate the impeller 96 due to the interaction between the water passing out of slot 93a and the vanes 96a of impeller 96. The impeller is integral with shaft 97 which has a worm gear portion 97a meshing with the gear 99 integral with shaft portions 100a and 100b whose free ends are journalled in bearings 101a and 101b. A projection 91c extends inwardly from cover 91 and serves as a support for the shaft upon which impeller 96 is mounted. The impeller is hollow and the opposite end of shaft 97 receives a projection 102 which serves as the shaft for rotatably mounting the impeller. The free end of the shaft 102 extends into the opening in projection 91c.

The lower end of shaft portion 100b is provided with a worm gear 100c which meshes with the teeth of gear 103 integrally joined to shaft 105 and extending outwardly from housing 92. A crank arm 106 is mounted upon the free end of shaft 105 to impart movement to the tube/fins by driving the elongated rod 53 (see FIG. 1e) by means of a pin 107 which may be inserted into one of the slots in elongated arm 53. Alternatively, a cam, shown as 52 in FIG. 1e, may be mounted upon the end of shaft 105.

The gear ratios are chosen to provide the desired tracking profile.

The gears 99, 100c, 97a and 103 are mounted within a gear housing defined by a hollow rectangular projection extending inwardly from wall 92a and sealed with a gear housing cover 108, upon which the slotted projection 93 is formed.

The water is captured within the hollow interior defined by cover 91 and housing 92 and passes out of the interior through opening 92b in the housing wall 92a.

Figure 10:
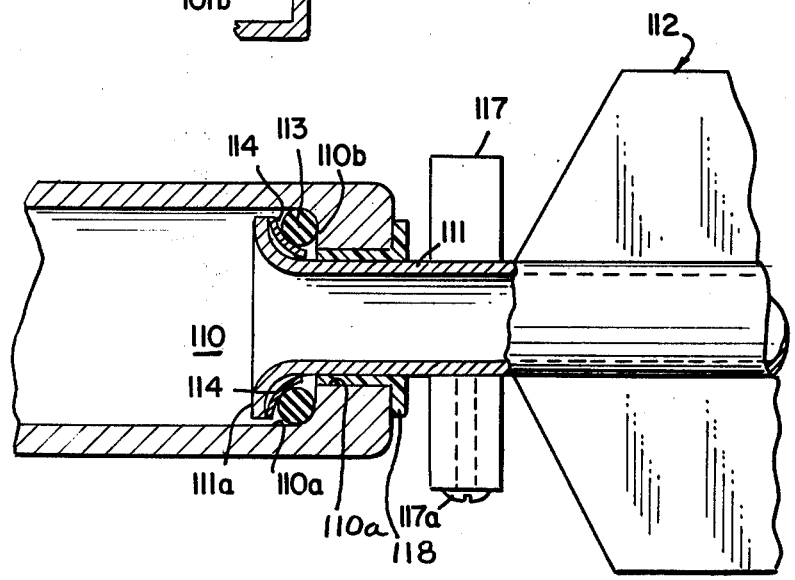
FIG. 10 shows a detailed view of hydraulic rotary joint usable with the fin/tubes of FIG. 1.

FIG. 10 shows a detailed sectional view of a rotary hydraulic joint comprised of opening 110a in a coupling member 110. The lefthand portion 110a of the opening is of enlarged diameter forming an intermediate ledge 110b. The free end of a tube 111 of fin/tube structure 112 has a flared portion 111a. An O-ring 113 is positioned between the flared end 111a and ledge 110b and is compressed somewhat to form a water-tight seal. A thin plastic washer 114, preferably made of a low-friction material such as tetrafluorethylene, is positioned between O-ring 113 and the flared end 111a of tube 111 to serve as a low friction sliding seal. A second low friction cylindrical-shaped bearing 118 similarly formed from a low-friction plastic material is mounted within opening 110a. The tube is maintained in position, i.e. is prevented from movement in the axial direction, by collar 117 slideably mounted upon tube 111 and provided with a set screw 117a to retain the water-tight seal. A similar seal may be provided at each end of each fin/tube.

Many variations and modifications will now become apparent to those skilled in the art. It is preferred therefore, that the present invention be limited not by the specific disclosure herein but only by the appended claims.

What is claimed is:

1. A solar energy collector comprising:
    a plurality of elongated fin/tube elements each of which includes an elongated tube and at least one fin extending radially outward from and integrally joined with said elongated tube;
    inlet and outlet manifold tubes arranged in spaced parallel fashion and having coupling sections extending outwardly from said manifold tubes at spaced intervals;
    a rotary hydraulic joint coupled between the ends of each of said elongated tubes and one of said coupling sections for rotatably joining each fin/tube element to said inlet and outlet manifold tubes while providing a leakproof joint; and
    solar tracking means for simultaneously rotating said fin/tube elements to properly orient said fin/tube elements with respect to said solar radiation, said solar tracking means comprising:
    eccentrically mounted cam means having a cam surface;
    means for rotating said cam means;
    a reciprocally mounted rod having a cam follower roller rollingly engaging said cam means;
    bias means normally urging said rod in a direction to urge said cam follower roller into engagement with said cam surface;
    a projection for each of said fin/tube elements, said projection extending radially outward from said tube; and
    coupling means for pivotally coupling the free end of each of said projections to said rod whereby linear movement of said rod simultaneously rotates said fin/tube elements.

2. The apparatus of claim 1 wherein said coupling means comprises pins fixably secured to said projection and slots arranged at intervals along said rod for receiving said pins to enable said pins to move along an arcuate path as said rod moves along a linear path.

3. The apparatus of claim 1 wherein said coupling means comprises pins fixedly secured at intervals along said rod and elongated slots radially aligned on each of said projections for receiving said pins to enable said projections to move along an arcuate path as said pins move along a linear path.

4. The apparatus of claim 1 wherein said solar collector further comprises a housing having an open-ended box-like shaped comprised of a floor and four upstanding side walls whose free ends define an opening;
    transparent means sealing said opening for preventing convection currents leaving said enclosure to thereby retain the heat energy in said housing; and
    said housing being adapted to be flush mounted upon a supporting surface.

5. The apparatus of claim 4 wherein said floor and side walls are covered with insulation.

6. The apparatus of claim 1 wherein each of said fin/tube elements has its exterior surface coated with a selective coating to yield a structure of high absorptivity and low emissivity to provide optimum energy absorption of solar radiation by said fin/tube elements.

7. The apparatus of claim 6 wherein each of said fin/tube elements is provided with a pair of planar fins lying along a common plane and extending radially outward from and integrally joined to said tube and wherein the exterior surface of said tubes and said fins being coated with a black coating.

8. The apparatus of claim 7 wherein said coating is anodized.

9. The apparatus of claim 7 wherein said fin/tube elements are formed of aluminum and said surface coating is anodized.

10. The apparatus of claim 6 wherein one surface of said fin is coated with a layer of insulation.

11. The apparatus of claim 1 further comprising means for introducing fluid into said inlet manifold tube under pressure sufficient to provide substantially uniform fluid flow through all of said fin/tube elements coupled to said inlet manifold tube.

12. The apparatus of claim 1 further comprising clamp means for securing each tube/fin element at a desired angle upon a mounting surface.

13. The apparatus of claim 1 wherein said means for rotating said cam means comprises a motor.

14. A solar energy collector comprising:
    a plurality of elongated fin/tube elements each of which includes an elongated tube and at least one fin extending radially outward from and integrally joined with said elongated tube;
    inlet and outlet manifold tubes arranged in spaced parallel fashion and having coupling sections extending outward from said manifold tubes at spaced intervals;
    a rotary hydraulic joint coupled between the ends of each of said elongated tubes and one of said coupling sections for rotatably joining each fin/tube element to said inlet and outlet manifold tubes while providing a leak-proof joint so that a fluid may be conducted from said inlet manifold tube, through said fin/tube elements and into said outlet manifold tube; and
    drive means for rotatably driving said fin/tube elements so as to assure that beam type solar radiation is oriented perpendicular to the flat surface of said fins, said drive means comprising:
    a housing coupled in series with one of said manifold tubes and adapted to have the fluid flowing in said manifold tube pass therethrough;
    rotatable impeller means in said housing, said impeller means being mounted to be rotated by said fluid flowing through said housing; and
    coupling means coupled to said impeller means for reciprocally rotating said fin/tube elements at a rate to keep the flat surfaces of said fins normal to the solar radiation.

15. The apparatus of claim 14 wherein said coupling means includes gear reduction means for reducing the rotational output of said rotatable impeller means.

16. The apparatus of claim 15 wherein said coupling means further includes a cam eccentrically connected to the output of said gear reduction means;
    a reciprocally mounted rod having a cam follower roller rollingly engaging the surface of said cam;

bias means normally urging said rod in a direction to urge said cam follower roller into engagement with said surface of said cam;

a projection for each of said fin/tube elements extending radially outward from said tube; and pin means for pivotally coupling the free end of each of said projections to said rod whereby linear movement of said rod simultaneously rotates all of said fin/tube elements.

17. The apparatus of claim 15 wherein said coupling means further includes a crank arm connected to the output of said gear reduction means;

a linkage arm having first and second ends, said first end being pivotally connected to the free end of said crank arm;

a reciprocally mounted rod having one end thereof pivotally connected to said second end of said linkage arm;

a projection for each of said fin/tube elements extending radially outward from said tube; and pin means for pivotally coupling the free end of each of said projection to said rod whereby linear movement of said rod simultaneously rotates all of said fin/tube elements.

* * * * *